United States Patent
Högberg et al.

(10) Patent No.: US 10,680,685 B2
(45) Date of Patent: *Jun. 9, 2020

(54) METHOD AND NODE IN A WIRELESS COMMUNICATION NETWORK

(71) Applicant: Huawei Technologies Co., Ltd., Shenzhen (CN)

(72) Inventors: Mats Högberg, Kista (SE); Björn Sihlbom, Gothenburg (SE); Ulrik Imberg, Kista (SE); Tomas Wilhelmsson, Kista (SE); Teijo Henrikki Lehtinen, Helsinki (FI); Yajun Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,630

(22) Filed: Mar. 1, 2019

(65) Prior Publication Data

US 2019/0199414 A1 Jun. 27, 2019

Related U.S. Application Data

(63) Continuation of application No. 15/796,185, filed on Oct. 27, 2017, now Pat. No. 10,277,292, which is a
(Continued)

(51) Int. Cl.
*H04L 27/28* (2006.01)
*H04B 7/0452* (2017.01)
(Continued)

(52) U.S. Cl.
CPC .......... *H04B 7/0452* (2013.01); *H01Q 3/247* (2013.01); *H01Q 5/42* (2015.01); *H01Q 21/061* (2013.01);
(Continued)

(58) Field of Classification Search
CPC ....... H04L 1/0618; H04L 1/06; H04B 7/0417; H05B 6/687
(Continued)

(56) References Cited

U.S. PATENT DOCUMENTS 10,277,292 B2 * 4/2019 Hogberg ............. H04B 7/0408
2010/0309848 A1 12/2010 Erceg et al.
(Continued)

OTHER PUBLICATIONS

U.S. Appl. No. 15/796.185, filed Oct. 27, 2017.
(Continued)

*Primary Examiner* — Khai Tran
(74) *Attorney, Agent, or Firm* — Leydig, Voit & Mayer, Ltd.

(57) ABSTRACT

Radio network node and method therein, for communication in a wireless communication system. The radio network node comprises: a plurality of antenna elements, a plurality of transceivers, wherein the plurality of transceivers comprise a first subset of the plurality of transceivers coupled to a first subset of the plurality of antenna elements and a second subset of the plurality of transceivers coupled to a second subset of the plurality of antenna elements; and a controller configured to adjust the first subset of the transceivers to work at a first frequency band, and to adjust the second subset of the transceivers to work at a second frequency band.

20 Claims, 10 Drawing Sheets

Related U.S. Application Data continuation of application No. PCT/EP2015/059243, filed on Apr. 28, 2015.

(51) Int. Cl.

| | |
|---|---|
| *H04B 7/0408* | (2017.01) |
| *H04B 7/0491* | (2017.01) |
| *H01Q 3/24* | (2006.01) |
| *H01Q 21/06* | (2006.01) |
| *H01Q 21/28* | (2006.01) |
| *H01Q 5/42* | (2015.01) |
| *H01Q 21/00* | (2006.01) |

(52) U.S. Cl.
CPC ........... *H01Q 21/28* (2013.01); *H04B 7/0408* (2013.01); *H04B 7/0491* (2013.01); *H01Q 21/0025* (2013.01)

(58) Field of Classification Search
USPC ......... 375/260, 267, 130; 342/371; 343/835, 343/893
See application file for complete search history.

(56) References Cited

U.S. PATENT DOCUMENTS

| | | |
|---|---|---|
| 2012/0127363 A1 | 5/2012 | Kanojia et al. |
| 2013/0260702 A1* | 10/2013 | Kenington ............... H04B 1/04 455/127.2 |
| 2014/0111396 A1 | 4/2014 | Hyjazie et al. |
| 2014/0375502 A1 | 12/2014 | Foo |
| 2015/0003307 A1 | 1/2015 | Moshfeghi |
| 2016/0119018 A1 | 4/2016 | Lindgren |
| 2017/0214152 A1 | 7/2017 | Gottl |
| 2017/0373906 A1* | 12/2017 | Maltsev ............ H04W 72/0453 |

OTHER PUBLICATIONS

Simeoni et al.,"Interleaving Sparse Arrays: a New Way to Polarization-Agile Array Antennas?" 2007 IEEE Antennas and Propagation Society International Symposium, pp. 3145-3148, Institute of Electrical and Electronics Engineers, New York, New York (Jun. 9-15, 2007).

W. P. DU Plessis et al.,"Improved Seeding Schemes for Interleaved Thinned Array Synthesis," IEEE Transactions on Antennas and Propagation, vol. 62, No. 11, pp. 5906-5910, Institute of Electrical and Electronics Engineers, New York, New York (Nov. 2014).

* cited by examiner

○ 310 Band 1

● 320 Band 2

○ 310 Band 1

● 320 Band 2

⊕ 340 Band 3

METHOD AND NODE IN A WIRELESS COMMUNICATION NETWORK

CROSS-REFERENCE TO RELATED APPLICATIONS

This application is a continuation of U.S. patent application Ser. No. 15/796,185, filed on Oct. 27, 2017, now U.S. Pat. No. 10,277,292 which is a continuation of International Application No. PCT/EP2015/059243, filed on Apr. 28, 2015. All of the afore-mentioned patent applications are hereby incorporated by reference in their entireties.

TECHNICAL FIELD

Embodiments described herein generally relate to a radio network node and a method in a radio network node, and more particularly, a mechanism for communicating wireless signals in a multiple antenna environment.

BACKGROUND

Some mobile communication systems offer high data rate by employing multiple antenna systems utilising Multiple-Input and Multiple-Output (MIMO).

Massive MIMO (MMIMO) is a recently emerged technology that uses large Antenna Arrays Systems (AAS) with individual transceivers connected to one or several antenna elements to improve throughput of wireless communication systems. A Massive MIMO system may sometimes also be referred to as "very large MIMO system", or "large-scale antenna system".

Antenna arrays with large number of antenna elements and transceivers enable to be used in both downlink and uplink to increase capacity by utilising high spatial resolution with beam forming and spatial multiplexing. Both single user MIMO with many layers and multi user MIMO will increase the network performance and system capacity. The MMIMO system cost and power consumption is highly dependent on the operating bandwidth that the MMIMO system comprising the Radio Frequency (RF) transceiver need to support.

The Base Transceiver Stations (BTS), which in some networks may be referred to as "eNB", "eNodeB", "NodeB" or "B node", depending on the technology and/or terminology used, are often equipped with a sector antenna and Remote Radio Units (RRU) that normally support one band and a Limited Bandwidth (LBW). The RRUs are connected to the antenna with a RF cable and for multi band solution also with a combiner or a diplexer.

For multi antenna solutions like MMIMO arrays the antenna and transceivers are placed in the antenna unit and can be tightly integrated. The cost and power consumption of the transceiver is highly dependent on the bandwidth that the transceiver needs to support. Thus, increased demands for bandwidth leads to increased power consumption and costs.

A conventional solution for supporting high bandwidth and multi band solutions is to add RRU and combine frequency bands to a single antenna or add another antenna. For high operating bandwidth (OBW) the RRU hardware needs to support higher bandwidth which is possible to solve within one frequency band to a high cost and power consumption.

Providing high bandwidth is a challenge for the transceiver and radio equipment involved, as the simultaneous support of high bandwidth makes the radio equipment more complicated and entails increased costs and power consumption.

For MMIMO solutions the dual bands are supported by band specific hardware, such as e.g. transceiver (TRX) and antenna array. For high OBW the TRX needs to support the entire OBW.

However, moving from single antenna systems towards MMIMO systems creates new problems and challenges that need to be solved, in order to reap the benefits. It appears that MMIMO requires further development for supporting higher OBW or higher dual band operation, than the RF transceivers maximum OBW.

SUMMARY

It is therefore an object to obviate at least some of the above mentioned disadvantages and to improve the performance in a wireless communication network.

This and other objects are achieved by the features of the appended independent claims. Further implementation forms are apparent from the dependent claims, the specification and the figures.

According to a first aspect, a radio network node is provided. The radio network node is, for example, configured for wireless communication. The radio network node comprises a plurality of antenna elements, forming an (e.g. multiple) antenna array. Further the radio network node comprises a plurality of transceivers, wherein each transceiver is coupled to at least one dedicated antenna element of the antenna array. The radio network node also comprises a controller configured to adjust a first subset of the plurality of transceivers to work at a first frequency band, and also configured to adjust a second subset of the plurality of transceivers to work at a second frequency band; wherein the first subset of transceivers and the second subset of transceivers are disjoint and are configured to operate at their respective frequency bands simultaneously.

Thanks to the provided radio network node and the antenna array, a higher operational bandwidth or dual band operation is achieved than the radio frequency transceiver's maximum operational bandwidth. By using transceivers with an operational bandwidth optimised for cost and power consumption, the disclosed radio network node will provide a solution for increasing operational bandwidth to a low cost and low power consumption by using two or more interleaved sparse antenna sub-arrays.

Further the disclosed solution provides increased flexibility. When the capacity is area limited, the bandwidth may be expanded. Also power density may be reduced. Each antenna branch may then operate at its intended bandwidth but in different channels. In case when the power is limited, the bandwidth may be reduced, which increases power density. Each antenna branch may operate at its intended bandwidth, but in same channels.

In a first possible implementation of the radio network node according to the first aspect, the controller is configured to adjust any number of subsets of the plurality of transceivers, up to the number of transceivers in the radio network node, to work at different frequency bands.

By enabling definition of a plurality of subsets of the plurality of transceivers, flexibility is achieved.

In a second possible implementation of the radio network node according to the first aspect, or the first possible implementation thereof, the controller is configured to select the members out of the plurality of transceivers of the first subset of transceivers and the members out of the plurality of transceivers of the second subset of transceivers respectively, based on requirements in the different frequency bands. An example may be high rise buildings where antenna beams may be formed in elevation direction.

Thereby, the subsets of transceivers may be selected appropriately for improved communication ability, based on the requirements. Thus a flexible configuration is achieved.

In a third possible implementation of the radio network node according to the first aspect, or any possible implementation thereof, the controller is configured to form a plurality of antenna sub-arrays, comprising at least a first antenna sub-array of antenna elements associated with the first subset of transceivers and a second antenna sub-array of antenna elements associated with the second subset of transceivers. Forming a sub-array comprises assigning antenna elements to the sub-array.

Thereby, the disclosed solution is further improved.

In a fourth possible implementation of the radio network node according to the first aspect, or any possible implementation thereof, wherein the difference in antenna area between a first antenna area formed by at least one of the antenna sub-arrays and a second antenna area formed by the antenna array, does not exceed a threshold level. The threshold level may be for example ±1%, ±5%, ±10% or ±20% of the first antenna area.

By letting any of the antenna sub-arrays form an antenna area which is approximately the same as the antenna area formed by the antenna array, the reduction in transmission power of the antenna sub-array is reduced more than the reduction in spectral efficiency, as the system performance is determined by the antenna aperture area rather than the number of involved transceivers. Thereby spectral efficiency per used transmission power unit is reduced, while operational bandwidth is in-creased, leading to improved communication.

In a fifth possible implementation of the radio network node according to the first aspect, or any possible implementation thereof, the controller is configured to form the plurality of the antenna sub-arrays such that each antenna element of the antenna array is assigned to (exactly) one of the antenna sub-arrays.

Thereby, the disclosed solution is further clarified.

In a sixth possible implementation of the radio network node according to the first aspect, or any possible implementation thereof, the controller is configured to form the plurality of antenna sub-arrays such that the plurality of antenna sub-arrays are interleaved, sparse arrays.

With the interleaved sparse arrays, the transceiver cost and power consumption can be kept low with moderate operational bandwidth and radio frequency power requirements and the MMIMO system can support double or more operational bandwidth than a single transceiver system without significant reduction in system performance.

In a seventh possible implementation of the radio network node according to the first aspect, or any possible implementation thereof, the controller is configured to operate the plurality of antenna sub-arrays on entirely overlapping bandwidth sections.

Thereby, the definition of the radio network node implementation is further specified.

In an eighth possible implementation of the radio network node according to the first aspect, or any possible implementation thereof, the controller is configured to operate the plurality of antenna sub-arrays on partly overlapping bandwidth sections.

Thereby, the definition of the radio network node implementation is further specified.

In a ninth possible implementation of the radio network node according to the first aspect, or any possible implementation thereof, the controller is configured to operate the plurality of antenna sub-arrays on non-overlapping bandwidth sections.

Thereby, the definition of the radio network node implementation is further specified.

In a tenth possible implementation of the radio network node according to the first aspect, or any possible implementation thereof, the non-overlapping bandwidth sections comprises adjacent, or separate, frequency bands.

Thereby, the definition of the radio network node implementation is further specified.

In an eleventh possible implementation of the radio network node according to the first aspect, or any possible implementation thereof, the controller is configured to adjust the plurality of antenna sub-arrays in dependence on number and location of antenna elements.

Thereby, the radio network node implementation may be further improved.

According to a second aspect, a method for wireless communication is provided in a radio network node. The radio network node comprises a plurality of antenna elements, forming an antenna array. Further, the radio network node comprises a plurality of transceivers, wherein each transceiver is coupled to at least one dedicated antenna element of the antenna array. Also, the radio network node comprises a controller. The method comprises adjusting a first subset of the plurality of transceivers to work at a first frequency band, and a second subset of the plurality of transceivers to work at a second frequency band; wherein the first subset of transceivers and the second subset of transceivers are disjoint. Further, the method also comprises operating the first subset of the plurality of transceivers and the second subset of transceivers at their respective adjusted frequency bands simultaneously.

Thanks to the provided method in the radio network node and the antenna array, a higher operational bandwidth or dual band operation is achieved than the radio frequency transceivers maximum operational bandwidth. By using transceivers with an operational bandwidth optimised for cost and power consumption, the disclosed radio network node will provide a solution for increasing operational bandwidth to a low cost and low power consumption by using two or more interleaved sparse arrays.

Further, the disclosed solution provides increased flexibility. When the capacity is area limited, the bandwidth may be expanded. Also power density may be reduced. Each antenna branch may then operate at its intended bandwidth but in different channels. In case when the power is limited, the bandwidth may be reduced, which increases power density. Each antenna branch may operate at its intended bandwidth, but in same channels.

In a first possible implementation of the method according to the second aspect, any number of subsets of the plurality of transceivers may be adjusted, up to the number of transceivers in the radio network node, to work at different frequency bands.

By enabling definition of a plurality of subsets of the plurality of transceivers, flexibility is achieved.

In a second possible implementation of the method according to the second aspect, or the first possible implementation thereof, the members out of the plurality of transceivers of the first subset of transceivers and the members out of the plurality of transceivers of the second subset of transceivers are selected respectively, based on requirements in the different frequency bands.

Thereby, the subsets of transceivers may be selected appropriately for improved communication ability.

In a third possible implementation of the method according to the second aspect, or any possible implementation thereof, the plurality of antenna sub-arrays are formed, comprising at least a first antenna sub-array of antenna elements associated with the first subset of transceivers and a second antenna sub-array of antenna elements associated with the second subset of transceivers.

Thereby, the disclosed solution is further specified.

In a fourth possible implementation of the method according to the second aspect, or any possible implementation thereof, the plurality of antenna sub-arrays are formed so that each antenna sub-array form an antenna area, which does not differ from the antenna area of the antenna array, exceeding a threshold level.

By letting the plurality of antenna sub-arrays forms an antenna area, which is approximately the same as the antenna area of the antenna, the spectral efficiency is reduced only by approximately 15-30% or there about in case of two antenna sub-arrays, while the transmission power is reduced to 50%. Thereby spectral efficiency per used transmission power unit is reduced, while operational bandwidth is increased, leading to improved communication.

In a fifth possible implementation of the method according to the second aspect, or any possible implementation thereof, the plurality of the antenna sub-arrays are formed such that each antenna element of the antenna array is assigned to exactly one of the antenna sub-arrays.

Thereby, the disclosed solution may be further improved.

In a sixth possible implementation of the method according to the second aspect, or any possible implementation thereof, the plurality of antenna sub-arrays are formed such that the plurality of antenna sub-arrays are interleaved, sparse arrays.

With the interleaved sparse array the transceiver cost and power consumption can be kept low with moderate operational bandwidth and radio frequency power requirements and the MMIMO system can support double or more operational bandwidth than the single transceiver system without significant reduction in system performance.

In a seventh possible implementation of the method according to the second aspect, or any possible implementation thereof, the plurality of antenna sub-arrays are operated on entirely overlapping bandwidth sections.

Thereby, the definition of the radio network node implementation is further specified.

In an eighth possible implementation of the method according to the second aspect, or any possible implementation thereof, the plurality of antenna sub-arrays are operated on partly overlapping bandwidth sections.

Thereby, the definition of the radio network node implementation is further specified.

In a ninth possible implementation of the method according to the second aspect, or any possible implementation thereof, the plurality of antenna sub-arrays are operated on non-overlapping bandwidth sections.

Thereby, the definition of the radio network node implementation is further specified.

In a tenth possible implementation of the method according to the second aspect, or any possible implementation thereof, the plurality of antenna sub-arrays are operated on non-overlapping bandwidth sections comprising adjacent, or separate, frequency bands.

Thereby, the definition of the radio network node implementation is further specified.

In an eleventh possible implementation of the method according to the second aspect, or any possible implementation thereof, the plurality of antenna sub-arrays are adjusted in dependence on number and location of antenna elements.

Thereby, the radio network node implementation may be further improved.

According to a third aspect, a computer program is provided, comprising program code for performing a method according to the second aspect or any implementation thereof, when the computer program is performed on the radio network node according to the first aspect or any implementation thereof.

Thanks to the provided computer program in the radio network node and the antenna array, a higher operational bandwidth or dual band operation is achieved than the radio frequency transceivers maximum operational bandwidth. By using transceivers with an operational bandwidth optimised for cost and power consumption, the disclosed radio network node will provide a solution for increasing operational bandwidth to a low cost and low power consumption by using two or more interleaved sparse arrays.

Further the disclosed solution provides increased flexibility. When the capacity is area limited, the bandwidth may be expanded. Also power density may be reduced. Each antenna branch may then operate at its intended bandwidth but in different channels. In case when the power is limited, the bandwidth may be reduced, which increases power density. Each antenna branch may operate at its intended bandwidth, but in same channels.

Other objects, advantages and novel features of the aspects of the disclosure will become apparent from the following detailed description.

BRIEF DESCRIPTION OF THE DRAWINGS

Various embodiments of the disclosure are described in more detail with reference to attached drawings illustrating examples of embodiments of the disclosure in which.

DETAILED DESCRIPTION

Embodiments of the disclosure described herein are defined as a radio network node and a method in a radio network node, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
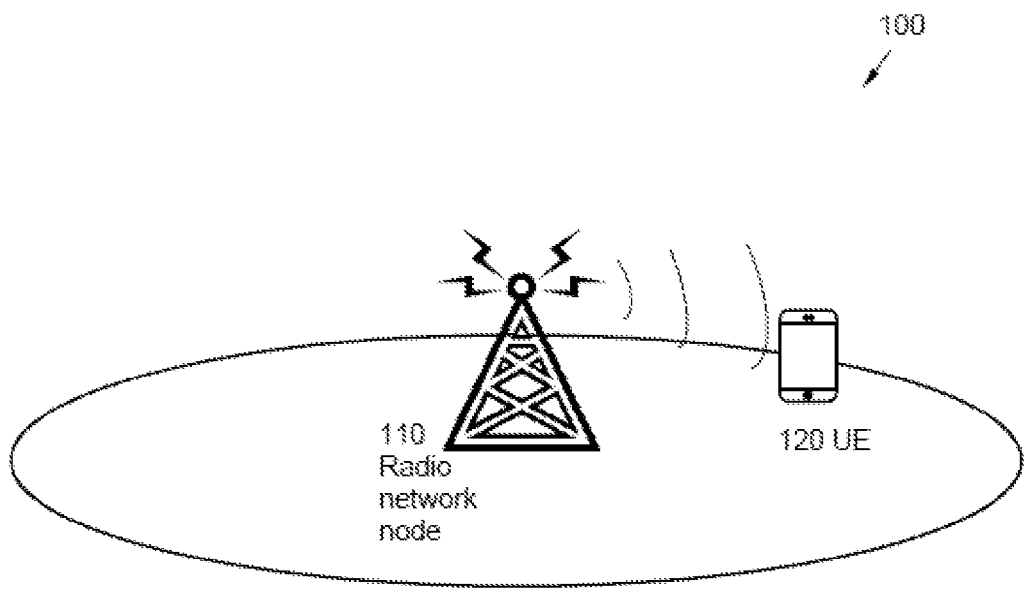
FIG. 1 is a block diagram illustrating a wireless communication network according to some embodiments of the disclosure.

FIG. 1 is a schematic illustration over a wireless communication network 100 comprising a radio network node 110 and a User Equipment (UE) 120.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

Further, the wireless communication network 100 is configurable for Massive MIMO (MMIMO) and Antenna Array Systems (AAS), according to some embodiments.

MMIMO is a recently emerged technology that uses large AAS with individual transceivers to improve throughput of wireless communication systems. MMIMO may sometimes also be referred to as "very large MIMO system", or "large-scale antenna system".

Antenna arrays with large number of elements enable the increase in capacity by utilising spatial beam forming and spatial multiplexing. The benefit of these large arrays is the ability to spatially resolve and separate received and transmitted signals with very high resolution.

The resolution is determined by the number of antenna elements, and their spacing. Typically the number of transceivers may be as high as 10× the maximum rank of the system. The rank is defined as the total number of parallel (same time and frequency) transmissions, including both wanted and unwanted signals (i.e. interference). MMIMO is sometimes loosely defined as a system using comprising 100 or more transceivers.

Basically, the more antennas the transmitter/receiver is equipped with in MMIMO, the more the possible signal paths, the better the performance in terms of data rate and link reliability. Advantages with MMIMO comprise improved UE detection and reduced transmit power per user equipment 120, thanks to the high resolution of MMIMO.

However, moving from single antenna systems towards MMIMO systems creates new problems and challenges that need to be solved, in order to reap the benefits.

The purpose of the illustration in FIG. 1 is to provide a simplified, general overview of the wireless communication network 100 and the involved methods and nodes, such as the radio network node 110 and user equipment 120 herein described, and the functionalities involved. The methods, radio network node 110 and user equipment 120 will subsequently, as a non-limiting example, be described in a 3GPP LTE/LTE-Advanced environment, but the embodiments of the disclosed methods, radio network node 110 and user equipment 120 may operate in a wireless communication network 100 based on another access technology such as, e.g., any of the above already enumerated. Thus, although the embodiments of the disclosure are described based on, and using the lingo of, 3GPP LTE systems, it is by no means limited to 3GPP LTE.

The illustrated wireless communication network 100 comprises the radio network node 110, which may send radio signals to be received by the user equipment 120.

It is to be noted that the illustrated network setting of one radio network node 110 and one user equipment 120 in FIG. 1 is to be regarded as a non-limiting example of an embodiment only. The wireless communication network 100 may comprise any other number and/or combination of radio network nodes 110 and/or user equipment 120. A plurality of user equipment 120 and another configuration of radio network nodes 110 may thus be involved in some embodiments of the disclosed disclosure.

Thus whenever "one" or "a/an" user equipment 120 and/or radio network node 110 is referred to in the present context, a plurality of user equipment 120 and/or radio network nodes 110 may be involved, according to some embodiments.

The radio network node 110 may according to some embodiments be configured for downlink transmission and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the user equipment 120 over a wireless interface, depending, e.g., of the radio access technology and/or terminology used.

The wireless communication network 100 covers a geographical area which is divided into cell areas, with each cell area being served by radio network nodes 110. Sometimes, the expression "cell" may be used for denoting the radio network node 110 itself. However, the cell may in normal terminology be used for the geographical area where radio coverage is provided by the radio network node 110 at a base station site. One radio network node 100, situated on the base station site, may serve one or several cells, typically three cells. The radio network nodes 110 may communicate over the air interface operating on radio frequencies with any user equipment 120 within range of the respective radio network node 110.

The user equipment 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary, within the wireless communication network 100, which sometimes also is referred to as a cellular radio system. The communication may be made, e.g., between two or more user equipment 120, between a user equipment 120 and a wire connected telephone and/or between a user equipment 120 and a server via a Radio Access Network (RAN) and possibly one or more core networks. The wireless communication may comprise various communication services such as voice, messaging, packet data, video, broadcast, etc.

Some embodiments of the disclosure define a modular implementation approach, and make it possible to reuse legacy systems such as e.g. standards, algorithms, implementations, components and products. The modular architecture also scales up/down to support implementations on e.g. small cell BTS products.

The radio network node 110 comprises an antenna array supporting full bandwidth. Further the radio network node 110 comprises a plurality of transceivers, supporting full bandwidth where the limited operating bandwidth can be configured. The radio network node 110 is configured for MMIMO and is configured for supporting a higher Operational Bandwidth (OBW) or dual band operation than the maximum OBW of the transceivers used in the radio network node 110.

The operating bandwidth for the transceivers is less than the maximum bandwidth where the transceiver can be tuned to. An example is a transceiver that can operate in the frequency range of 2-4 GHz but can support a channel of max 40 MHz (max OBW) in this frequency range. Typically with an increase of a transceiver's maximum OBW also cost, complexity and power consumption are increased.

According to some embodiments, a solution is provided for creating a wideband or dual band solution with limited OBW transceivers, to use a concept with interleaved sparse arrays. By dividing the array into two or more sub-arrays with a regular or irregular antenna element grid, interleaved sparse sub-arrays are created.

With this interleaved sparse array solution, the cost and power consumption may be reduced while still supporting a high OBW or dual band support for a MMIMO system, as it is enabled that some of the transceivers work at a first limited bandwidth and some others of the transceivers work at a second limited bandwidth (adding together with the first limited bandwidth to an operating bandwidth of the antenna array being larger than the maximum OBW of the individual transceivers). The disclosed solution supports applicable standards (such as e.g. 3GPP), procedures and its interfaces.

Thus a cost and power effective MMIMO system is achieved that provides high capacity for a larger operating bandwidth than the individual transceivers support with only one MMIMO array.

With the interleaved sparse array according to the disclosed embodiments, the transceiver cost and power consumption can be kept low with moderate OBW and RF power requirements and the MMIMO system can support double or more OBW than the single transceiver system without significant reduction in system performance.

Figure 2:
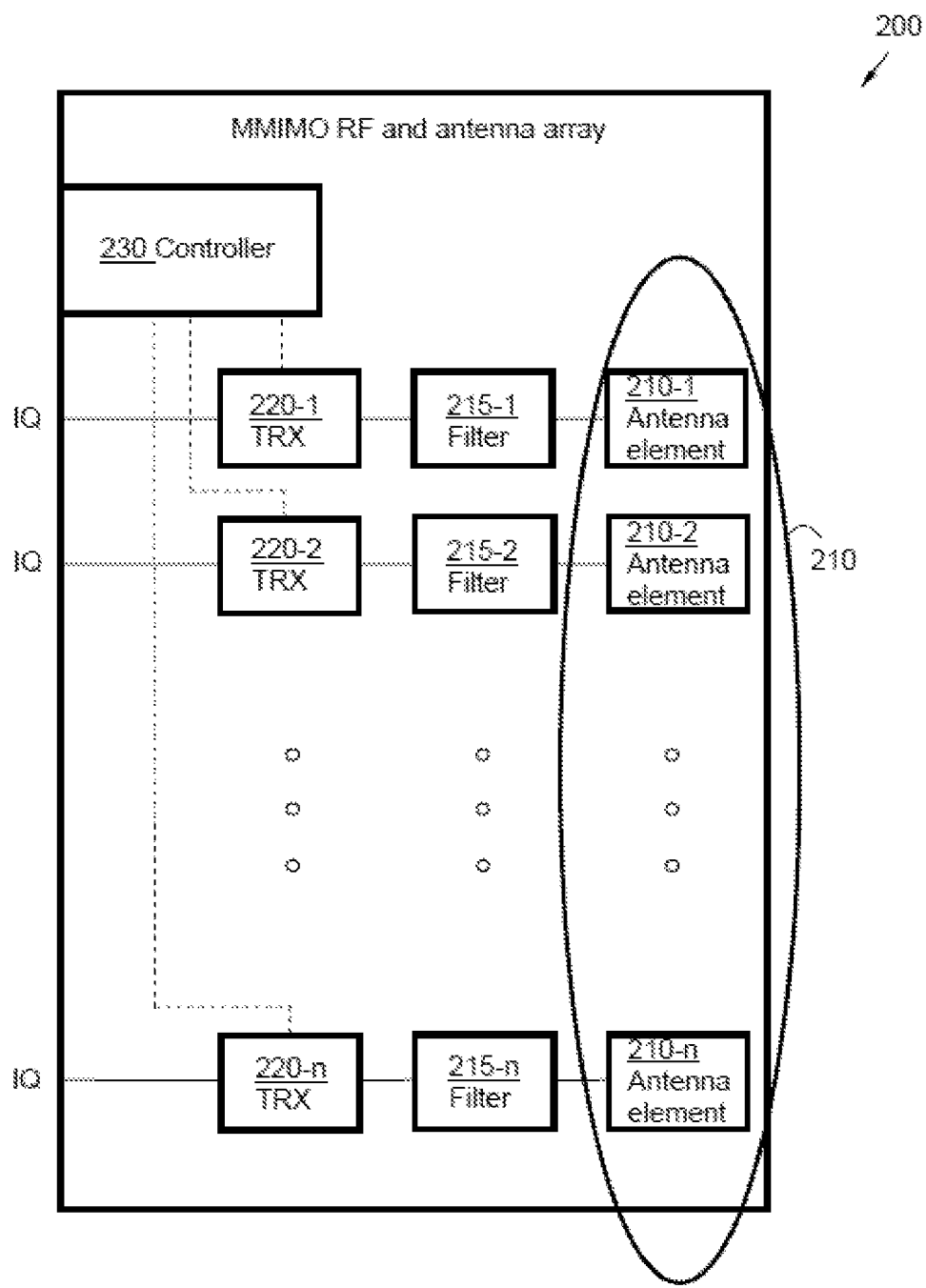
FIG. 2 is a block diagram illustrating a radio network node according to some embodiments of the disclosure.

FIG. 2 discloses an embodiment of a MMIMO system 200 in the radio network node 110 in the wireless communication network 100. The MMIMO system 200 in the radio network node 110 comprises an Antenna Array 210, which is configurable for MMIMO. The Antenna Array 210 comprises a plurality of antenna elements 210-1, 210-2, ..., 210-n. The antenna elements 210-1, 210-2, ..., 210-n may sometimes also be referred to as Active Antenna Modules (AAM), or in short as elements.

Further the radio network node 110 also comprises a plurality of transceivers 220-1, 220-2, ..., 220-n. Each transceiver 220-1, 220-2, ..., 220-n may be mapped, i.e. connected to at least one corresponding antenna element 210-1, 210-2, ..., 210-n, possibly via a filter 215-1, 215-2, ..., 215-n. Further, in some embodiments, each transceiver 220-1, 220-2, ..., 220-n may be directly or with further components in-between mapped to, or connected to, several corresponding antenna elements 210-1, 210-2, ..., 210-n. However, a given antenna element 210-1, 210-2, ..., 210-n is always connected to the same transceiver 220-1, 220-2, ..., 220-n.

The radio network node 110 (e.g. a controller 230 of the radio network node 110) and the MMIMO system 200 are configured to divide the antenna array 210 and the transceivers 220-1, 220-2, ..., 220-n into several, two or more, interleaved sparse arrays, in order to support larger operational bandwidth, dual band or multi band and where each interleaved sparse sub array supports one operational band.

The antenna array 210 support and therefore each of the antenna elements 210-1, 210-2, 210-n, support full bandwidth. Further, the transceivers 220-1, 220-2, ..., 220-n support full bandwidth, where a limited operational bandwidth (smaller than the full bandwidth) may be configured within the full bandwidth.

Each transceiver 220-1, 220-2, ..., 220-n may be individually configured to a specific frequency band and frequency channel in some embodiments.

The total RF power may be divided between the numbers of interleaved sparse arrays. Power per sub-array=Total power for complete array·(Sum number of elements in sub-arrays/Total number of elements). This assumes the same output RF power per antenna element 210-1, 210-2, ..., 210-n.

The number of interleaved sparse arrays is dependent on the capacity requirements and wanted coverage (and the number of combinations of transceivers 220-1, 220-2, ..., 220-n and antenna elements 210-1, 210-2, ..., 210-n).

A MMIMO array uses several transceivers 220-1, 220-2, ..., 220-n and antenna elements 210-1, 210-2, ..., 210-n of an antenna array 210. In the illustrated embodiment in FIG. 2, the MMIMO array is shown where each transceiver 220-1, 220-2, . . . , 220-*n* may be individually configured to operate in a specific frequency band or frequency channel and is connected to one antenna element 210-1, 210-2, . . . , 210-*n*. Each transceiver 220-1, 220-2, . . . , 220-*n* can also be connected to several antenna elements 210-1, 210-2, . . . , 210-*n* of the antenna array 210.

Furthermore, the radio network node 110 comprises the controller 230. The controller 230 is configured to adjust a first subset of the plurality of transceivers 220-1, 220-2, . . . , 220-*n* to work at a first frequency band, and also configured to adjust a second subset of the plurality of transceivers 220-1, 220-2, . . . , 220-*n* to work at a second frequency band. The first subset of transceivers 220-1, 220-2, . . . , 220-*n* and the second subset of transceivers 220-1, 220-2, . . . , 220-*n* are disjoint (i.e. a transceiver of the plurality of transceivers 220-1, 220-2, . . . , 220-*n* is at maximum part of one of the subsets). Furthermore the two subsets of transceivers are configured to operate at their respective frequency bands simultaneously.

The discussed example with two subsets of the plurality of transceivers 220-1, 220-2, . . . , 220-*n* is merely an example; in other embodiments the controller 230 may be configured to adjust any other number of subsets (limited by the number of transceivers and/or antenna elements). The controller 230 may be configured to adjust any number of subsets of the plurality of transceivers 220-1, 220-2, . . . , 220-*n* in some embodiments, up to the number of transceivers 220-1, 220-2, . . . , 220-*n* in the radio network node 110, to work at different frequency bands.

The controller 230 may furthermore be configured to adaptively select the first subset of transceivers 220-1, 220-2, . . . , 220-*n* (i.e. the members of the first subset) and the second subset of transceivers 220-1, 220-2, . . . , 220-*n* (i.e. the members of the second subset) respectively, based on requirements in the different frequency bands.

The controller 230 may in addition be configured to form a plurality of antenna sub-arrays, comprising at least a first antenna sub-array of antenna elements 210-1, 210-2, . . . , 210-*n* associated with the first subset of transceivers 220-1, 220-2, . . . , 220-*n* and a second antenna sub-array of antenna elements 210-1, 210-2, . . . , 210-*n* associated with the second subset of transceivers 220-1, 220-2, . . . , 220-*n*.

Furthermore, the controller 230 may also be configured to form the plurality of the antenna sub-arrays such that each antenna element 210-1, 210-2, . . . , 210-*n* of the antenna array 210 is assigned to exactly one of the antenna sub-arrays in some embodiments.

The controller 230 may in addition be configured to form the plurality of antenna sub-arrays such that the plurality of antenna sub-arrays are interleaved, sparse sub-arrays.

Furthermore, the controller 230 may be configured to operate the plurality of antenna sub-arrays on entirely overlapping bandwidth sections in some embodiments. In some embodiments, the controller 230 may be alternatively configured to operate the plurality of antenna sub-arrays on partly overlapping bandwidth sections. Further, the controller 230 may be configured to operate the plurality of antenna sub-arrays on non-overlapping bandwidth sections. The non-overlapping bandwidth sections may comprise adjacent, or separate, frequency bands.

The controller 230 may further be configured to adjust the plurality of antenna sub-arrays in dependence on number and location of antenna elements 210-1, 210-2, . . . , 210-*n*. By this a desired power density and/or beam forming can be achieved.

Figure 3A:
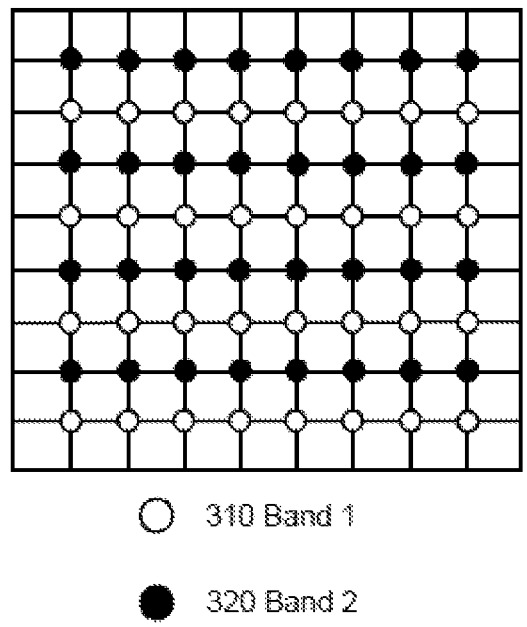
FIG. 3A is a block diagram illustrating 8×8 antenna elements according to an embodiment of the disclosure.

FIG. 3A illustrates an example of an interleaved sparse array 210 comprising 8×8 antenna elements 210-1, 210-2, . . . , 210-*n*. In the FIG. 3A every circle represents a single antenna element 210-1, 210-2, . . . , 210-*n* being connected to a dedicated transceiver 220-1, 220-2, . . . , 220-*n*.

With the previously described properties of the radio network node 110, the MMIMO system 200, the antenna array 210 and the corresponding transceivers 220-1, 220-2, . . . , 220-*n* may support larger operating bandwidth than the single transceivers 220-1, 220-2, . . . , 220-*n* can.

In the illustrated example in FIG. 3A, the MMIMO array supports a dual band operation in a first band 310 and a second band 320. Each of the antenna elements 210-1, 210-2, . . . , 210-*n* of the antenna array 210 is either assigned to operate at the first band 310 or the second band 320. This assignment is achieved by the controller 230 adjusting the corresponding transceivers 220-1, 220-2, . . . , 220-*n* either to operate at the first band 310 or the second 320. As already mentioned this assignment can be changed by the controller 230 during operation.

The illustrated assignment of antenna elements 210-1, 210-2, . . . , 210-*n* to operate at the first band 310 and the second band 320 respectively is merely an example.

Figure 3B:
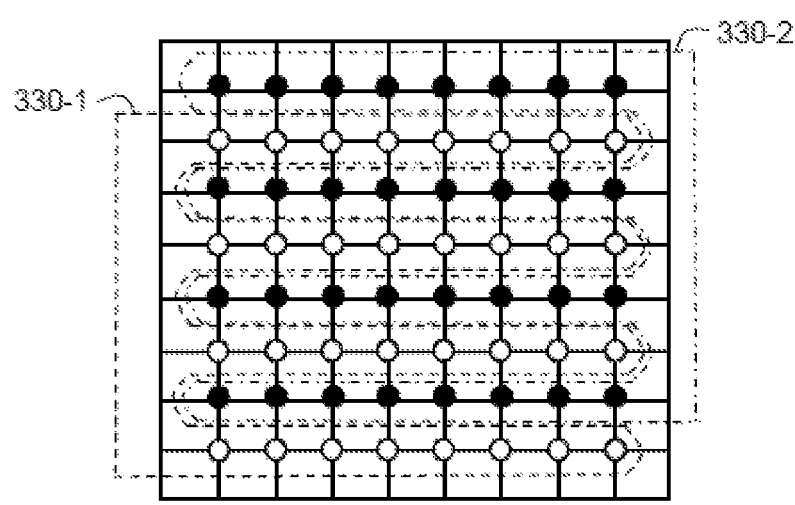
FIG. 3B is a block diagram illustrating 8×8 antenna elements according to an embodiment of the disclosure.

FIG. 3B illustrates an example of an interleaved sparse array comprising 8×8 antenna elements 210-1, 210-2, . . . , 210-*n*, comprising a first antenna sub-array 330-1, operating at the first band 310 and a second antenna sub-array 330-2 operating at the second band 320.

In the illustrated embodiment, each of the antenna elements 210-1, 210-2, . . . , 210-*n* and the corresponding associated transceivers 220-1, 220-2, . . . , 220-*n* is assigned to either the first antenna sub-array 330-1 or the second antenna sub-array 330-2.

Figure 4A:
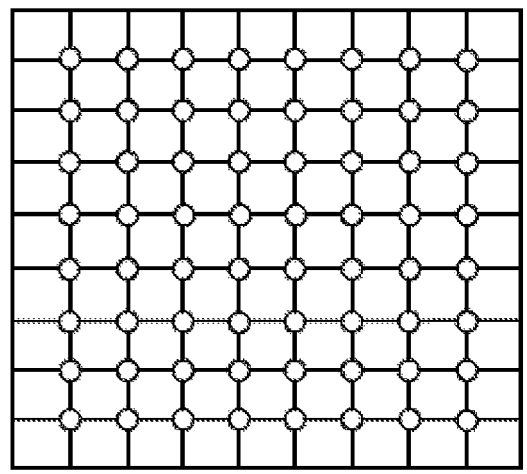
FIG. 4A is a block diagram illustrating 8×8 antenna elements according to an embodiment of the disclosure.

FIG. 4A illustrates an example of a MMIMO system 200 comprising an 8×8 dual polarised full antenna array 210. All transceivers 220-1, 220-2, . . . , 220-*n* and antenna elements 210-1, 210-2, . . . , 210-*n* work at the same frequency band.

Figure 4B:
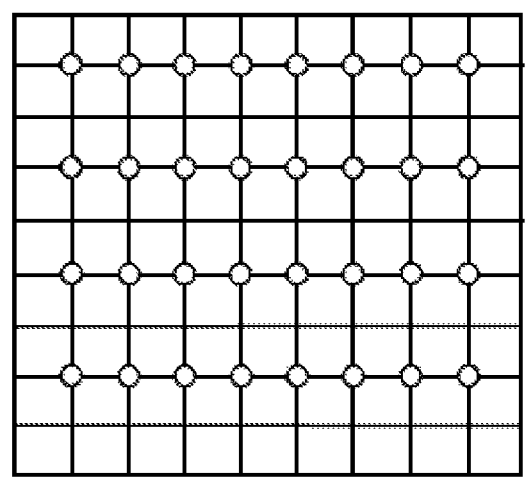
FIG. 4B is a block diagram illustrating 4×8 antenna elements according to an embodiment of the disclosure.

FIG. 4B illustrates an alternative MMIMO system 200 comprising a 4×8 dual polarised sparse antenna array. Only half of the transceivers 220-1, 220-2, . . . , 220-*n* and antenna elements 210-1, 210-2, . . . , 210-*n* of the full antenna array 210 are employed to work at a same frequency band.

Figure 5A:
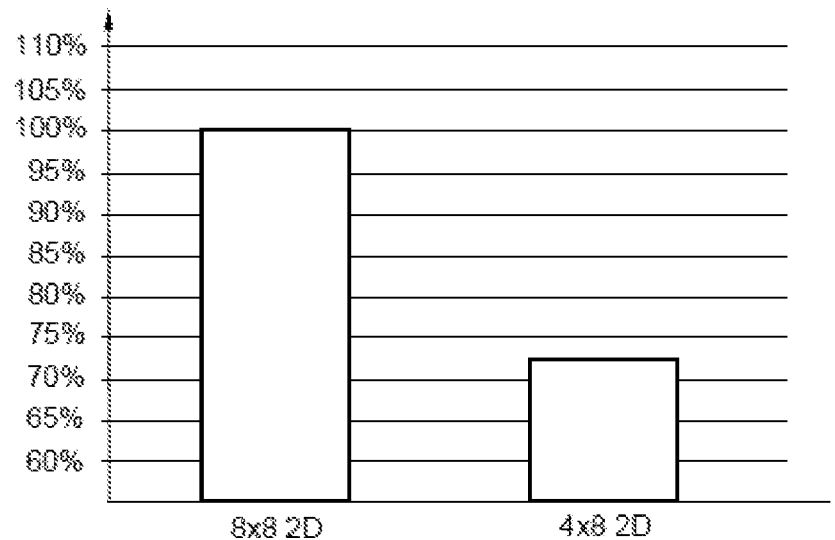
FIG. 5A is a block diagram illustrating relative cell spectral efficiency, according to an embodiment.
Figure 5B:
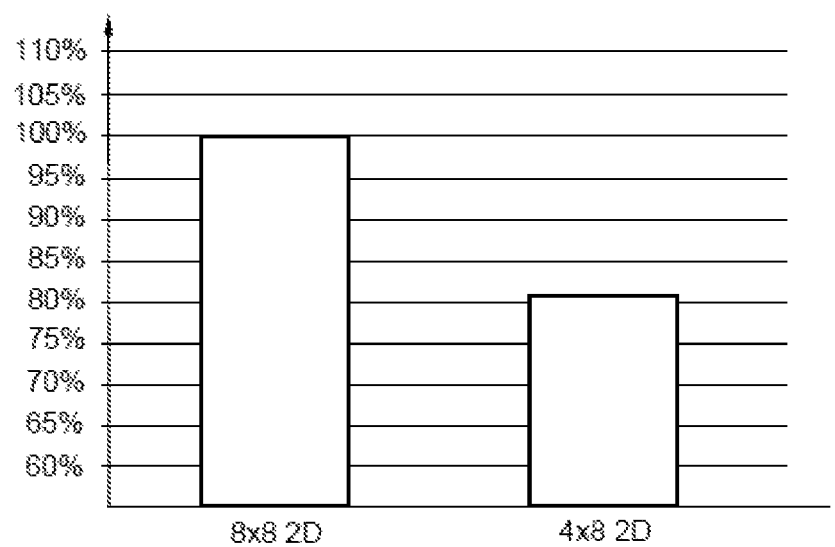
FIG. 5B is a block diagram illustrating relative cell spectral efficiency, according to an embodiment.

The benefit of using the interleaved sparse antenna arrays is shown in the system simulation example illustrated in FIGS. 5A and 5B, which illustrates spectral efficiency for a full antenna array 210 as illustrated in FIG. 4A and a sparse antenna array as illustrated in FIG. 4B.

FIG. 5A illustrates relative cell spectral efficiency for a Dense Urban macro noise limited scenario in bps/Hz, while FIG. 5B illustrates relative cell spectral efficiency for an interference limited scenario. To the left in both FIG. 5A and FIG. 5B is spectral efficiency of the full 8×8 antenna array 210 as illustrated in FIG. 4A, and to the right both in FIG. 5A and FIG. 5B, the spectral efficiency of the 4×8 sparse antenna array as illustrated in FIG. 4B is shown.

The full antenna array 210 and the sparse antenna array have the same antenna aperture which means that the antenna directivity and spatial resolution are almost the same. The sparse antenna array forms an antenna area, which does not differ significantly from (or is even the same as) the antenna area of the full antenna array 210. The respective antenna area of the sparse antenna array and the antenna array 210 may be defined as a quadrilateral (such as e.g. a square, a rectangle, a parallelogram or a rhomboid or similar form) embracing all antenna elements 210-1, 210-2, . . . , 210-*n* of the respective antenna array.

The number of transceivers 220-1, 220-2, . . . , 220-*n*, antenna elements 210-1, 210-2, . . . , 210-*n* and the RF power are half in the sparse antenna array compared to the full antenna array 210 while the relative spectral efficiency is reduced by only 15-30% dependent on if the scenario is noise limited (as illustrated in FIG. 5A) or interference limited (as illustrated in FIG. 5B). Thereby, transmission energy may be saved by exchanging the full antenna array 210 for the sparse antenna array, while the relative spectral efficiency may be only marginally reduced. Furthermore, the other half of the full antenna array 210 can be used for a further sparse array working at a different frequency band.

Thus it is possible to reduce energy consumption, e.g. in periods of low traffic requests and to make achieve a higher operating bandwidth by having only few loss regarding spectral efficiency.

In other words, the transceivers 220-1, 220-2, ..., 220-n and antenna elements 210-1, 210-2, ..., 210-n may be used for forming two or more interleaved sparse antenna arrays, each one operating on a separate band 310, 320, thereby providing a larger operational bandwidth in comparison with the full antenna array 210.

Thus it can be seen that the system performance is determined mainly by the antenna aperture area, i.e. directivity and spatial resolution, and less on the number of transceivers 220-1, 220-2, ..., 220-n. As already mentioned, the cost and power consumption is highly dependent on the operating bandwidth that the transceiver 220-1, 220-2, ..., 220-n need to support.

However, the illustrated method is based on the idea of using an interleaved sparse antenna array to support higher operational bandwidth or dual frequency band operation where the performance of all the interleaved sparse sub-array is greater than to use the full antenna array 210 for one band and transceiver maximum OBW, in some embodiments. Hence, transceivers with low operating bandwidth can be used while still having the same overall operating bandwidth of the complete system. Therefore cost and power consumption of embodiments of present disclosure are lower than conventional system employing transceivers with large operating bandwidths.

Figure 6:
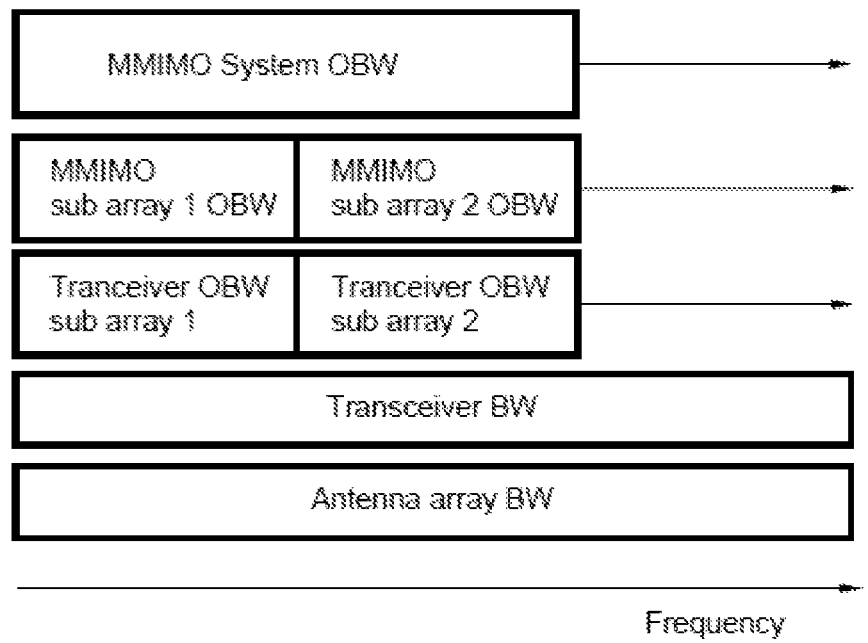
FIG. 6 is a block diagram illustrating a MMIMO interleaved sparse array according to an embodiment.

FIG. 6 illustrates a concept for a MMIMO system 200 with two interleaved sparse arrays where twice the max operation bandwidth for the transceiver 220-1, 220-2, ..., 220-n can be achieved. In the example in FIG. 6 it is assumed that a first plurality of the transceivers 220-1, 220-2, ..., 220-n work at a first frequency band 310 (having a bandwidth in their maximum operating bandwidth) and the corresponding antenna elements 210-1, 210-2, ..., 210-n assigned to a first antenna sub-array 330-1 work accordingly in the first frequency band 310. Furthermore, a second plurality of the transceivers 220-1, 220-2, ..., 220-n work at a second frequency band 320 (having a bandwidth in their maximum operating bandwidth) and the corresponding antenna elements 210-1, 210-2, ..., 210-n assigned to a second antenna sub-array 330-2 work accordingly in the second frequency band 320. The resulting overall MIMO system OBW is therefore twice the maximum OBW of a single transceiver. Furthermore, it can be seen that nevertheless all transceivers 220-1, 220-2, ..., 220-n and antenna elements 210-1, 210-2, ..., 210-n support the full bandwidth of the MIMO system 200.

By using transceivers 220-1, 220-2, ..., 220-n with an OBW optimised for cost and power consumption, the disclosed solution will reduce costs and power consumption and the MMIMO system 200 may increase the OBW of a single transceiver by using two or more interleaved sparse antenna arrays working at different bandwidths.

The interleaved sparse antenna array may be configured to support any antenna sub array configurations. The advantage is to be able to flexible configure transceivers 220-1, 220-2, ..., 220-n and antenna elements 210-1, 210-2, ..., 210-n to support different frequency channels. This makes it possible to have different output RF power per frequency channel or to configure the antenna array to support different antenna array configuration that may be used to beam form antenna patterns to cover wanted geographical areas. One example may be high rise buildings where antenna beams are formed in elevation direction of the buildings. Thereby an increased flexibility is achieved.

FIGS. 7A-7E illustrates some arbitrary examples of various configurations of interleaved sparse antenna arrays. The disclosed method and radio network node 110 is not limited to any particular configuration of antenna arrays.

Figure 7A:
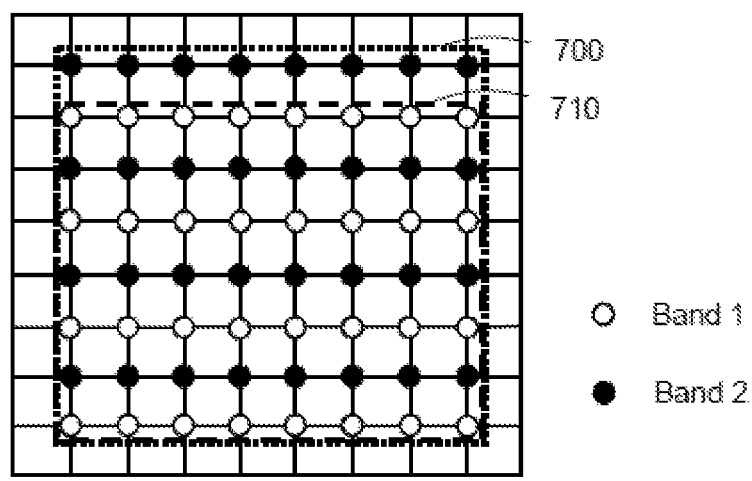
FIG. 7A is a block diagram illustrating an interleaved sparse array according to an embodiment.

In the illustrated embodiment in FIG. 7A, the full antenna array 210 forms a first antenna area 700 and the first sparse antenna sub-array 330-1 forms a second antenna area 710. As illustrated, the respective antenna area 700, 710 of the first sparse antenna sub-array 330-1 and the antenna array 210 are rectangular, embracing all antenna elements 210-1, 210-2, ..., 210-n of the respective antenna array.

Thus, in some embodiments, each of the plurality of antenna sub-arrays 330-1, 330-2 may form an antenna area 710, which is approximately the same as the antenna area 700 formed by the complete antenna array 210. The antenna area 710 formed by the respective antenna sub-arrays 330-1, 330-2 may not differ more than 5%-20% from the antenna area 700 of the antenna array 210 in some embodiments.

An advantage thereby provided is that the relative spectral efficiency is only marginally reduced for the antenna sub-arrays 330-1, 330-2 in comparison with the full antenna array 210, while enabling dual band operation, as discussed in conjunction with FIG. 5A and FIG. 5B.

Figure 7B:
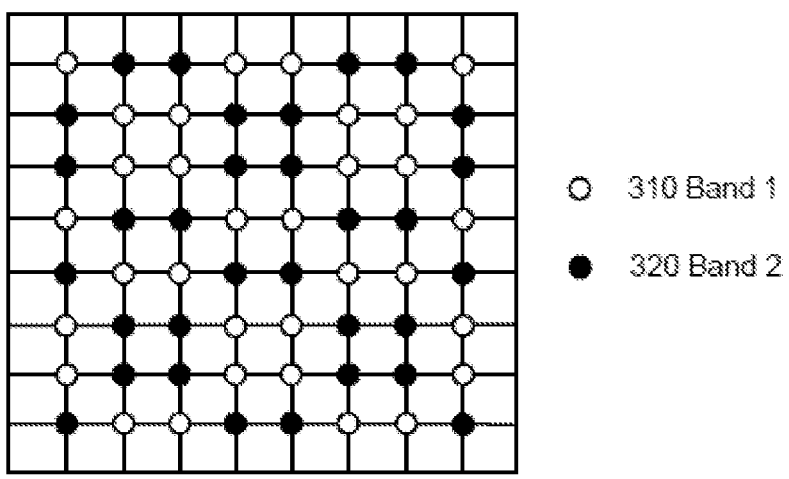
FIG. 7B is a block diagram illustrating an interleaved sparse array according to an embodiment.
Figure 7C:
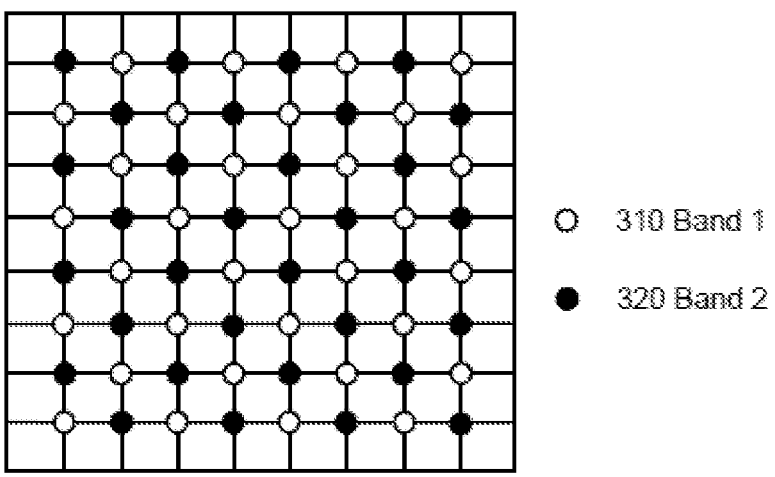
FIG. 7C is a block diagram illustrating an interleaved sparse array according to an embodiment.

FIG. 7B and FIG. 7C illustrates some variants of dual interleaved sparse antenna arrays. These are however only merely some examples of such created interleaved sparse antenna arrays; various variants of the illustrated embodiments are possible in different embodiments.

Figure 7D:
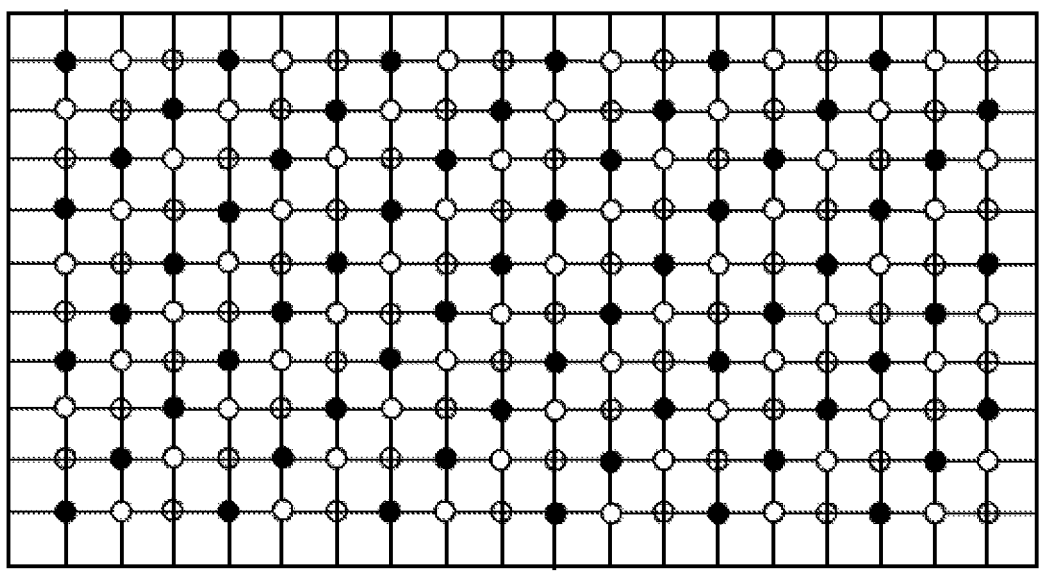
FIG. 7D is a block diagram illustrating an interleaved sparse array according to an embodiment.
Figure 7E:
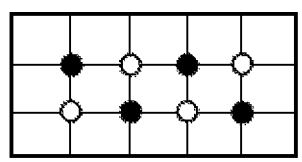
FIG. 7E is a block diagram illustrating an interleaved sparse array according to an embodiment.

The interleaved sparse antenna array concept may be used for more than two sub-arrays 330-1, 330-2, as illustrated in FIG. 7D. Further, the interleaved sparse antenna array concept is not limited to an 8×8 array, but may be used for any arbitrary size of the antenna array as for example illustrated in FIGS. 7D-7E. Thus the antenna array may comprise hundreds or thousands of antenna elements 210-1, 210-2, ..., 210-n, such as e.g. organised in an i×j matrix, where i, j and n may be any respective integer within the interval 1-∞. The integers i, j and/or n may be identical, or alternatively distinct in different embodiments.

An advantage with utilising the interleaved sparse antenna array concept for more than two sub-arrays 330-1, 330-2 is that the supported operational bandwidth can be increased further.

Figure 8:
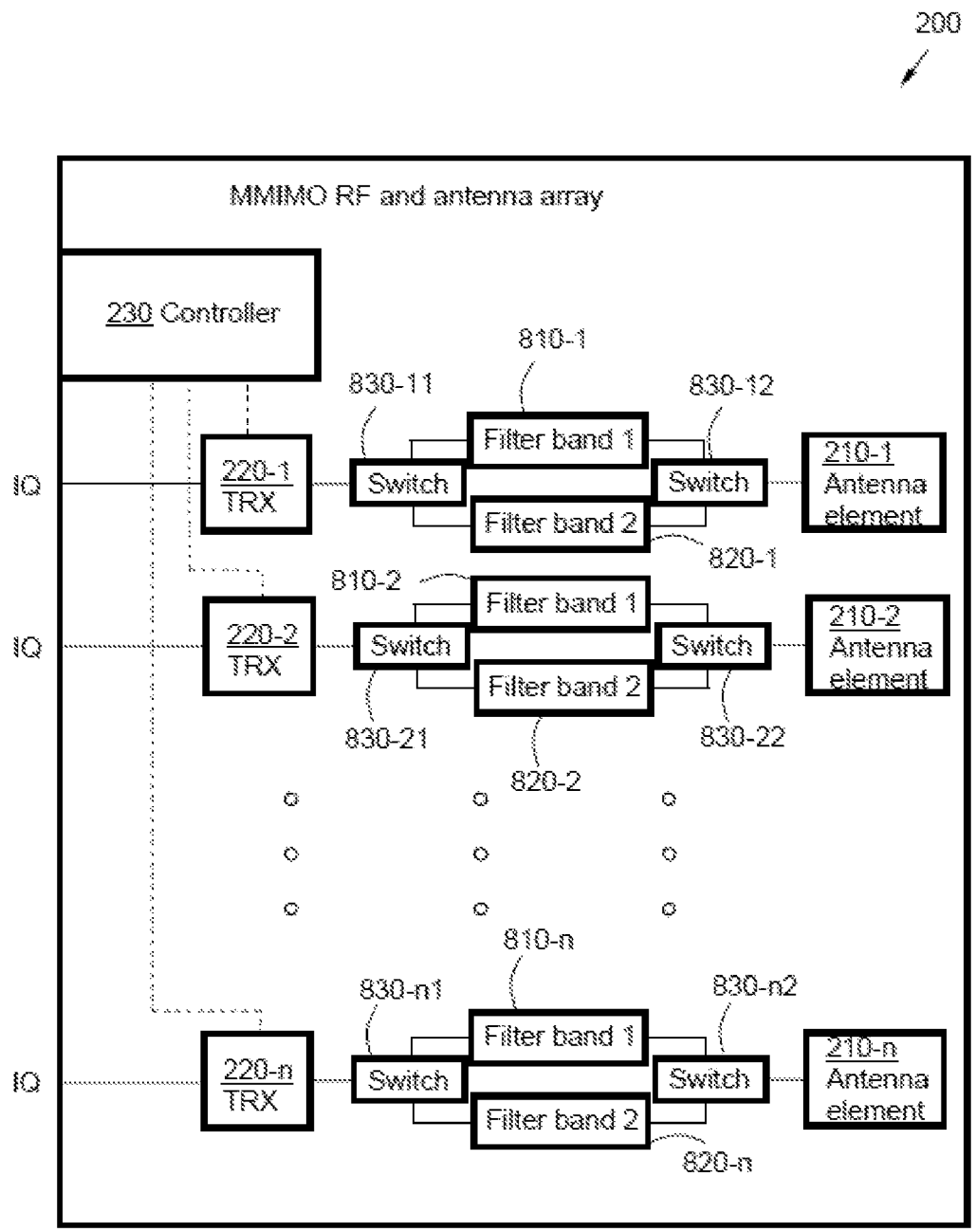
FIG. 8 is a block diagram illustrating a radio network node according to an embodiment.

FIG. 8 illustrates another embodiment of a MMIMO system 200 in the radio network node 110 in the wireless communication network 100, for dual band operation. The arrangement comprises antenna elements 210-1, 210-2, ..., 210-n in connection with transceivers 220-1, 220-2, ..., 220-n, and also switches 830-11, 830-12, ..., 830-n2, first band filters 810-1, 810-2, ..., 810-n and second band filters 820-1, 820-2, ..., 820-n.

Furthermore, a controller 230 is comprised, configured to adjust a first subset of the plurality of transceivers 220-1, 220-2, ..., 220-n to work at a first frequency band 310, and also configured to adjust a second subset of the plurality of transceivers 220-1, 220-2, ..., 220-n to work at a second frequency band 320. The first subset of transceivers 220-1, 220-2, ..., 220-*n* and the second subset of transceivers 220-1, 220-2, ..., 220-*n* are disjoint and are configured to operate at their respective frequency bands 310, 320 simultaneously.

The controller 230 may further be configured to control the switches 830-11, 830-12, ..., 830-*n*2. By adjusting the switches 830-11, 830-12, ..., 830-*n*2, the controller 230 may alter between applying the first band filters 810-1, 810-2, ..., 810-*n* and second band filters 820-1, 820-2, ..., 820-*n*. Thereby, the controller 230 may adjust any transceiver 220-1, 220-2, ..., 220-*n* and antenna element 210-1, 210-2, ..., 210-*n* to work at either first frequency band 310 or the second frequency band 320, and correspondingly adjust the switches 830-11, 830-12, ..., 830-*n*2 for applying the corresponding band filters 810-1, 810-2, ..., 810-*n*; 820-1, 820-2, ..., 820-*n*.

The antenna elements 210-1, 210-2, ..., 210-*n* support both operating frequency bands 310, 320 in the illustrated embodiment.

Figure 9:
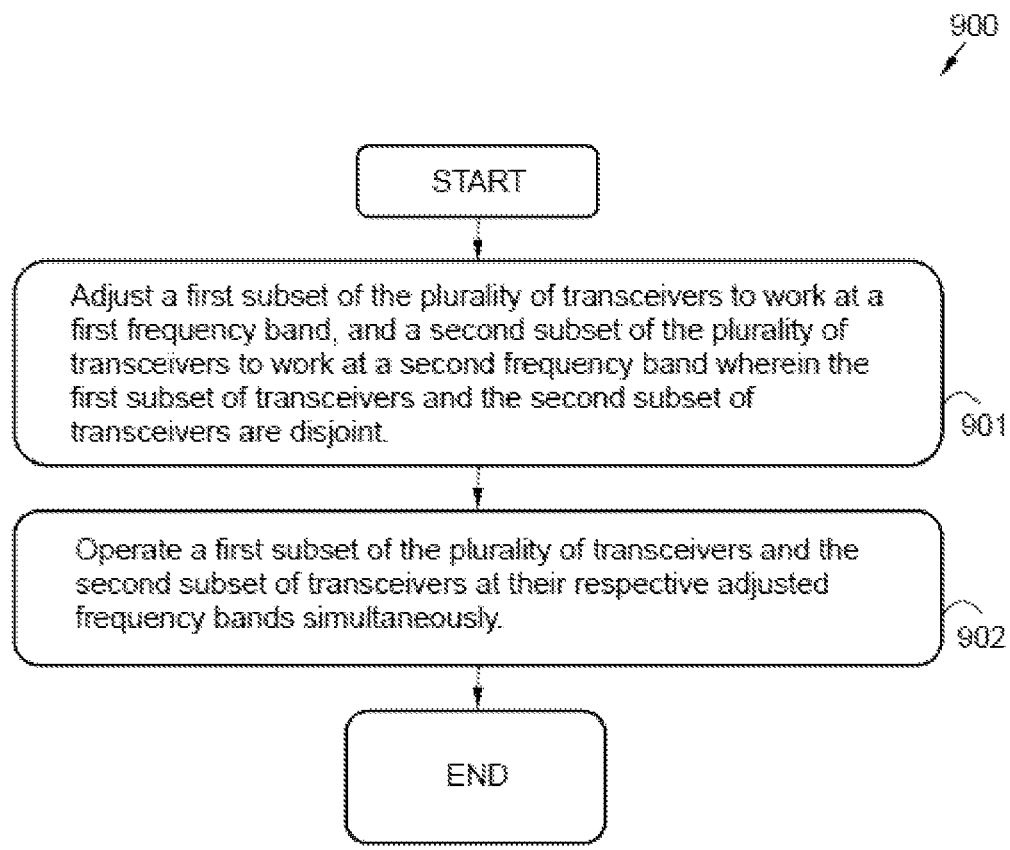
FIG. 9 is a flow chart illustrating a method in a radio network node according to an embodiment of the disclosure.

FIG. 9 is a flow chart illustrating a method 900 according to an embodiment in a radio network node 110, for wireless communication with a user equipment 120 in a wireless communication system 100. The radio network node 110 comprises a plurality of antenna elements 210-1, 210-2, ..., 210-*n*, forming a (multiple) antenna array 210. The antenna array 210 may be configured for MMIMO transmission in some embodiments. Further the radio network node 110 comprises a controller 230.

The antenna array 210 comprises a multitude of n antenna elements 210-1, 210-2, ..., 210-*n*, such as e.g. hundred or more antenna elements 210-1, 210-2, ..., 210-*n* in some embodiments. The multitude of antenna elements 210-1, 210-2, ..., 210-*n* may in some embodiments be mounted at a distance from each other, within the antenna array 210, such that some, several or even all of the antenna elements 210-1, 210-2, ..., 210-*n* may be able to receive/transmit the same signal from/to the user equipment 120. The antenna array 210 may comprise a physical antenna array.

The wireless communication network 100 may be based on 3GPP LTE or any related communication access technology. Further, the wireless communication system 100 may be based on FDD or TDD in different embodiments. The radio network node 110 may comprise an eNodeB according to some embodiments. The signal to be transmitted may comprise Orthogonal Frequency Division Multiplexing (OFDM) symbols according to some embodiments.

To appropriately communicate with the user equipment 120, the method 900 may comprise a number of actions 901-902.

It is however to be noted that any, some or all of the described actions 901-902, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 900 may comprise the following actions:

Action 901 comprises adjusting a first subset of the plurality of transceivers 220-1, 220-2, ..., 220-*n* to work at a first frequency band 310 and a second subset of the plurality of transceivers 220-1, 220-2, ..., 220-*n* to work at a second frequency band 320. The first subset of transceivers 220-1, 220-2, ..., 220-*n* and the second subset of transceivers 220-1, 220-2, ..., 220-*n* are disjoint.

In some embodiments, any number of subsets of the plurality of transceivers 220-1, 220-2, ..., 220-*n* may be adjusted, up to the number of transceivers 220-1, 220-2, ..., 220-*n* in the radio network node 110, to work at different frequency bands 310, 320.

Further, according to some embodiments, the adjustment of the subsets of the plurality of transceivers 220-1, 220-2, ..., 220-*n* may comprise selecting the first subset of transceivers 220-1, 220-2, ..., 220-*n* and the second subset of transceivers 220-1, 220-2, ..., 220-*n* respectively, based on requirements in the different frequency bands 310, 320.

In addition, the adjustment of the subsets of the plurality of transceivers 220-1, 220-2, ..., 220-*n* may comprise forming a plurality of antenna sub-arrays 330-1, 330-2, comprising at least a first antenna sub-array 330-1 of antenna elements 210-1, 210-2, ..., 210-*n* associated with the first subset of transceivers 220-1, 220-2, ..., 220-*n* and a second antenna sub-array 330-2 of antenna elements 210-1, 210-2, ..., 210-*n* associated with the second subset of transceivers 220-1, 220-2, ..., 220-*n*.

Such antenna sub-array 330-1, 330-2 may be formed by assigning antenna elements 210-1, 210-2, ..., 210-*n* to the antenna sub-array 330-1, 330-2.

The antenna sub-arrays 330-1, 330-2 may be interleaved with each other, forming sparse interleaved antenna sub-arrays 330-1, 330-2.

In some embodiments, the antenna sub-arrays 330-1, 330-2 may operate on the same frequency band 310, 320, on different channels.

Furthermore, in some embodiments, adjustment of the subsets of the plurality of transceivers 220-1, 220-2, ..., 220-*n* may additionally comprise forming the plurality of antenna sub-arrays 330-1, 330-2 so that at least one of the antenna sub-arrays 330-1, 330-2 forms a first antenna area 710. The difference in antenna area between the first antenna area 710 formed by at least one of the antenna sub-arrays 330-1, 330-2 and the second antenna area 700 formed by the antenna array 210, does not exceed a threshold level, in some embodiments.

The threshold level may be for example ±1%, ±5%, ±10% or ±20% of the first antenna area 710. Thus any antenna sub-array 330-1, 330-2 may form the first antenna area 710, which does not differ significantly from the second antenna area 700 of the antenna array 210.

The adjustment of the subsets of the plurality of transceivers 220-1, 220-2, ..., 220-*n* may also in some embodiments comprise forming the plurality of the antenna sub-arrays 330-1, 330-2 such that each antenna element 210-1, 210-2, ..., 210-*n* of the antenna array 210 is assigned to exactly one of the antenna sub-arrays 330-1, 330-2. Different antenna elements 210-1, 210-2, ..., 210-*n* can be assigned to the same or different antenna sub-array 330-1, 330-2 (e.g. depending on the location of the respective antenna element 210-1, 210-2, ..., 210-*n* in the antenna array 210).

Additionally, the subsets of the plurality of transceivers 220-1, 220-2, ..., 220-*n* may in some embodiments be adjusted by forming the plurality of antenna sub-arrays 330-1, 330-2 such that the plurality of antenna sub-arrays 330-1, 330-2 are interleaved, sparse arrays 330-1, 330-2.

According to some embodiments, the plurality of antenna sub-arrays 330-1, 330-2 may be adjusted in dependence on number and location of antenna elements 210-1, 210-2, ..., 210-*n*.

Further, according to some embodiments, the adjustment of the subsets of the plurality of transceivers 220-1, 220-2, ..., 220-*n* may also comprise application of filters, such as e.g. first band filters 810-1, 810-2, . . . , 810-*n* and/or second band filters 820-1, 820-2, . . . , 820-*n*, e.g. via switches 830-11, 830-12, . . . , 830-*n*2, in some embodiments.

Action 902 comprises operating the first subset of the plurality of transceivers 220-1, 220-2, . . . , 220-*n* and the second subset of transceivers 220-1, 220-2, . . . , 220-*n* at their respective adjusted frequency bands 310, 320 simultaneously.

According to some embodiments, the plurality of antenna sub-arrays 330-1, 330-2 may be operated on entirely overlapping bandwidth sections.

In some further embodiments, the plurality of antenna sub-arrays 330-1, 330-2 may be operated on partly overlapping bandwidth sections.

Furthermore, the plurality of antenna sub-arrays 330-1, 330-2 may be operated on non-overlapping bandwidth sections in some embodiments. Such non-overlapping bandwidth sections may comprise adjacent, or separate frequency bands in different embodiments.

The above described actions 901-902 to be performed in the radio network node 110 may be implemented through one or more processing circuits in the radio network node 110, together with a computer program product for performing the functions of the actions 901-902. Thus a computer program product, comprising instructions for performing the actions 901-902 in the radio network node 110 may perform wireless communication with a user equipment 120 in a wireless communication system 100, when the computer program product is loaded in the one or more processing circuits of the radio network node 110.

Thus a computer program comprising program code for performing the method 900 according to any of the actions 901-902, may perform wireless communication with a user equipment 120 in a wireless communication system 100, when the computer program is loaded into the one or more processing circuits of the radio network node 110.

Thereby a computer program product may comprise a computer readable storage medium storing program code thereon for use by a radio network node 110, for wireless communication with a user equipment 120 in a wireless communication system 100. The program code comprising instructions for executing a method 900 comprising: adjusting a first subset of the plurality of transceivers 220-1, 220-2, . . . , 220-*n* to work at a first frequency band 310, and a second subset of the plurality of transceivers 220-1, 220-2, . . . , 220-*n* to work at a second frequency band 320; wherein the first subset of transceivers 220-1, 220-2, . . . , 220-*n* and the second subset of transceivers 220-1, 220-2, . . . , 220-*n* are disjoint; and operating the first subset of the plurality of transceivers 220-1, 220-2, . . . , 220-*n* and the second subset of transceivers 220-1, 220-2, . . . , 220-*n* at their respective adjusted 901 frequency bands 310, 320 simultaneously.

The computer program product mentioned above may be provided for instance in the form of a data carrier carrying computer program code for performing at least some of the actions 901-902 according to some embodiments when being loaded into the one or more processing circuits of the radio network node 110. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the radio network node 110 remotely, e.g., over an Internet or an intranet connection.

The terminology used in the description of the embodiments as illustrated in the accompanying drawings is not intended to be limiting of the described method 900 and/or network node 110. Various changes, substitutions and/or alterations may be made, without departing from the disclosure as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A radio network node comprising:
   a plurality of antenna elements;
   a plurality of transceivers, wherein the plurality of transceivers comprise a first subset of the plurality of transceivers coupled to a first subset of the plurality of antenna elements and a second subset of the plurality of transceivers coupled to a second subset of the plurality of antenna elements; and
   a controller configured to adjust the first subset of the plurality of transceivers to work at a first frequency band, and also configured to adjust the second subset of the plurality of transceivers to work at a second frequency band.

2. The radio network node according to claim 1, wherein the plurality of antenna elements forms an antenna array, the first subset of the plurality of antenna elements forms a first antenna sub-array, and the second subset of the plurality of antenna elements forms a second antenna sub-array.

3. The radio network node according to claim 2, wherein a difference in antenna area between a first antenna area formed by the first antenna sub-arrays or the second antenna sub-array, and a second antenna area formed by the antenna array is below a threshold level.

4. The radio network node according to claim 1, wherein the first subset of transceivers and the second subset of transceivers are disjoint.

5. The radio network node according to claim 1, wherein the first antenna sub-array and the second antenna sub-array are interleaved, sparse antenna arrays.

6. The radio network node according to claim 2, wherein the controller is further configured to operate the first antenna sub-array and the second antenna sub-array on entirely overlapping bandwidth sections.

7. The radio network node according to claim 2, wherein the controller is configured to operate the first antenna sub-array and the second antenna sub-array on partly overlapping bandwidth sections.

8. The radio network node according to claim 2, wherein the controller is configured to operate the first antenna sub-array and the second antenna sub-array on non-overlapping bandwidth sections.

9. The radio network node according to claim 8, wherein the non-overlapping bandwidth sections are adjacent or separate.

10. The radio network node according to claim 2, wherein the controller is configured to adjust the first antenna sub-array and the second antenna sub-array in dependence on number and location of antenna elements.

11. A method, in a radio network node, wherein the radio network node comprises a plurality of antenna elements, and a plurality of transceivers, wherein the plurality of transceivers comprise a first subset of the plurality of transceivers coupled to a first subset of the plurality of antenna elements and a second subset of the plurality of transceivers coupled to a second subset of the plurality of antenna elements, and a controller, the method comprises:
  adjusting, by the controller, the first subset of the plurality of transceivers to work at a first frequency band, and the second subset of the plurality of transceivers to work at a second frequency band; and
  operating, by the controller, the first subset of the plurality of transceivers at the first frequency band, and the second subset of transceivers at the second frequency band.

12. The method according to claim 11, wherein the plurality of antenna elements forms an antenna array, the first subset of the plurality of antenna elements forms a first antenna sub-array, and the second subset of the plurality of antenna elements forms a second antenna sub-array.

13. The method according to claim 12, wherein a difference in antenna area between a first antenna area formed by the first antenna sub-arrays or the second antenna sub-array, and a second antenna area formed by the antenna array is below a threshold level.

14. The method according to claim 11, wherein the first subset of transceivers and the second subset of transceivers are disjoint.

15. The method according to claim 11, wherein the first antenna sub-array and the second antenna sub-array are interleaved, sparse antenna arrays.

16. The method according to claim 12, further comprising:
  operating, by the controller, the first antenna sub-array and the second antenna sub-array on non-overlapping bandwidth sections.

17. The method according to claim 12, further comprising:
  operating, by the controller, the first antenna sub-array and the second antenna sub-array on partly overlapping bandwidth sections.

18. The method according to claim 12, further comprising:
  operating, by the controller, the first antenna sub-array and the second antenna sub-array on non-overlapping bandwidth sections.

19. The method according to claim 18, wherein the non-overlapping bandwidth sections are adjacent or separate.

20. The method according to claim 12, further comprising:
  adjusting, by the controller, the first antenna sub-array and the second antenna sub-array in dependence on number and location of antenna elements.

* * * * *